Patented Sept. 19, 1933

1,927,539

UNITED STATES PATENT OFFICE 1,927,539

USE OF LACTATES IN BRUSHING LACQUERS

Charles Bogin, Terre Haute, Ind., assignor to Commercial Solvents Corporation, Terre Haute, Ind., a corporation of Maryland No Drawing. Application October 2, 1931
Serial No. 566,586

10 Claims. (Cl. 134—79)

This invention relates to the manufacture of nitrocellulose compositions suitable for use as lacquers and varnishes, and especially compositions suitable for brush application.

The principles underlying the formulation of nitrocellulose lacquers or varnishes suitable for brush application differ essentially from those governing the formulation of spray lacquers. In the case of spray lacquers, rapid drying is the essential feature, whereas for brushing purposes the drying period must be lengthened sufficiently to allow ample time for brushing the lacquer evenly over the section of the surface being coated. In addition, the lacquer should remain sufficiently plastic or flowable for a brief period after its application so that the brush marks and other imperfections will disappear before the film sets. However, it is disadvantageous to have too long a drying period, for in this case the prime advantage of a lacquer over other coating materials would be lost. It is desirable to have the drying time short enough so that after the complete application of one coat to a particular piece of work, a second coat may be applied without undue delay. Rapidity of drying after the brushing and flow periods is desirable also to prevent sagging or running of the coat which would result in an imperfect finish.

Another essential property of a good brushing lacquer is a lack of any tendency to attack previous coatings on the surface to which it is applied. Brushing lacquers are utilized largely for architectural purposes and for refinishing furniture, and in these cases it is often applied over an old finish of lacquer, paint or varnish. Paint films, oleoresinous varnish films, and especially lacquer films, are softened by the usual lacquer solvent mixtures and during the brushing operation, with its added mechanical attack upon the films, these prior coatings are often partially mixed with the new coating material, giving rise to an imperfect finish. This is especially undesirable in cases where the old film is of a different color, and in such cases it is almost impossible to obtain satisfactory results. In formulating a brushing lacquer, then, a solvent should be chosen which will have a minimum action upon prior coatings and will, at the same time, have sufficient solvent power for the constituents which are to be included in the lacquer.

Aside from the special requirements discussed above, a brushing lacquer should have the other desirable qualities of good spray lacquers, such as plasticity of the film, hardness, freedom from cotton blush, freedom from gum blush, etc. The purpose of the present invention is the formulation of a brush lacquer which will possess these desirable qualities, as well as the three qualities discussed above, namely, good brushability, rapid drying, and minimum attack on prior coatings.

Until the present time, a brushing lacquer having all of these properties has not been formulated. U. S. Patent 1,692,584 to Shipley, discloses the use of certain solvents such as the monoethyl ether of ethylene glycol, methyl benzoate, methyl salicylate, etc., in conjunction with gasolene.

These solvents, mentioned above, have a relatively low tolerance for petroleum hydrocarbons, so that in their use a high proportion of solvent to that of gasolene is necessary. The result is that although there is no excess nitrocellulose solvent present, there is a considerable excess of active gum solvent and therefore a tendency of the lacquer to attack previous coatings. Some of the solvents mentioned by Shipley are undesirable from the standpoint of slow drying, for example methyl salicylate, and all of them possess the undesirable quality of gum incompatibility. In the present invention, the difficulties encountered with the compositions recommended by Shipley, are obviated by the use of lactic acid esters of monohydric aliphatic alcohols containing more than two carbon atoms in conjunction with special petroleum distillates.

It is known that lactic acid esters have previously been recommended for lacquer purposes. Nobel, English Patent 15,915/1894, mentions the use of "ethers of lactic acid" but makes no disclosure as to the means for their use. U. S. Patent 1,195,673 to Grüter, discloses the use of ethyl lactate in conjunction with aromatic hydrocarbons, and U. S. Patent 1,673,111 to Gabriel and Bogin, discloses the use of normal butyl lactate in conjunction with low boiling solvents and aromatic hydrocarbons. However, none of these compositions possess the advantages which are obtained in the present invention by the use of lactic acid esters in conjunction with special petroleum distillates. These improved compositions possess the advantages of excellent brushability, rapid drying, minimum attack on previous coatings and freedom from cotton or gum blush. Further advantages of these compositions will be apparent from the following description.

In carrying out the present invention, the solvents used are lactic acid esters of monohydric aliphatic alcohols containing more than two, and preferably three to five, carbon atoms in conjunction with special petroleum distillates. The esters may be for example, isopropyl lactate, normal propyl lactate, isobutyl lactate, secondary butyl lactate, normal butyl lactate, or amyl lactate. Although a mixture of solvents may be used, a single solvent is advantageous from the standpoint of obtaining maximum brushability with minimum drying time. This is due to the fact that if a mixture is chosen such that the time for total evaporation is equal to that of a single solvent, the initial rate of evaporation will be higher than that of the single solvent and will therefore decrease the brushing time. This, of course, is more pronounced in the case of solvents whose evaporation rates differ widely, whereas mixtures of closely related compounds, such as iso- and secondary butyl lactates, would be quite satisfactory. The butyl lactates, either separately or in mixtures, have been found to be preferable to the other lactic acid esters for most brushing purposes, but the present invention is not limited to the use of these particular esters.

The following data will serve to identify some of the esters used in the present invention. The isopropyl, normal propyl, normal butyl, isobutyl, secondary butyl, and amyl esters of lactic acid are colorless, mobile liquids, somewhat less dense than water, soluble in water to the extent of a small fraction of 1% for the amyl esters to 100% for the isopropyl ester. In pure form they possess mild and pleasant odors. They are good solvents for nitrocellulose and for the usual gums which are used in lacquers, are miscible with all common lacquer solvents and diluents, and are especially adapted for the present purpose, in that they possess high tolerance for petroleum hydrocarbons.

Isopropyl lactate boils without decomposition at 165–168° C., has a density of 0.988 at 20° C./20° C., and is miscible with water. It possesses the following tolerance values for diluents: turpentine 2.4, xylol 4.7, and naphtha 1.6. These tolerance values are given in terms of cubic centimeters of the particular hydrocarbon which may be added to a solution of nitrocellulose in 1 cc. of the solvent before the nitrocellulose becomes gelled or precipitated, the concentration of nitrocellulose in the solution being such that the final solution contains approximately 8% of nitrocellulose.

Normal propyl lactate boils at 86° C. under 40 mm. pressure, has a density of 0.996 at 20° C./20° C., and is soluble in water to the extent of about 8%. At room temperature it evaporates about 81.5% as fast as diacetone alcohol. It possesses the following tolerance values for diluents: turpentine 2.4, xylol 5.3, and naphtha 1.2.

Isobutyl lactate boils at 96° C. under 40 mm. pressure, has a density of 0.971 at 20° C./20° C., and is soluble in water to the extent of about 2%. At room temperature it evaporates about 59.3% as fast as diacetone alcohol. It possesses the following tolerance values for diluents: turpentine 3.2, xylol 5.6, and naphtha 1.9.

Secondary butyl lactate boils without decomposition at 180° C., has a density of 0.974 at 20° C./20° C., and is soluble in water to the extent of about 4%. It possesses the following tolerance values for diluents: turpentine 2.8, and naphtha 1.9.

Normal butyl lactate boils at 185° C., has a density of 0.973 at 20° C./20° C., and is substantially insoluble in water. At room temperature it evaporates about 39.4% as fast as diacetone alcohol. It possesses the following tolerance values for diluents: turpentine 3.2, xylol 5.7 and naphtha 1.9.

Normal amyl lactate boils at 112° C. under 40 mm. pressure, has a density of 0.952 at 20° C./20° C., and is substantially insoluble in water. At room temperature it evaporates about 26% as fast as diacetone alcohol. It possesses the following tolerance values for diluents: turpentine 3.6, xylol 5.1 and naphtha 2.5.

It is to be understood that the above data are given in the way of description and not as definite limitations of the properties of the compounds. The data were obtained from commercial grades of the esters and will therefore vary somewhat according to the particular batch from which the sample is chosen. The properties listed will serve, however, to enable one skilled in the art to identify the materials specified.

In conjunction with the lactic acid esters such as those described above, the common solvents or "latent solvents" may be employed. For example, solvents such as propyl acetate, propyl propionate, propyl butyrate, butyl acetate, butyl propionate, butyl butyrate, amyl acetate, or amyl propionate may be used. In such a case it is advisable to choose a solvent having an evaporation rate approximately equal to that of the lactic acid ester employed, but it is preferred in general to use only lactic acid esters as the active solvents. However, it is often advantageous to employ "latent solvents" such as the butyl alcohols or amyl alcohols in conjunction with the lactic acid esters. Such materials are activated by the active solvents, and may therefore be substituted for a part of them thus decreasing the cost of the lacquer appreciably. It may be noted that alcohols such as butyl alcohol are usually present in small amounts due to the fact that they are used to wet the cotton, and also to the fact that commercial grades of esters such as butyl lactate contain a certain amount of the free alcohol.

The choice of the proper petroleum distillate is of prime importance in the present invention. In the first place it is essential that a distillate be chosen which will entirely evaporate before all of the solvent in order that the nitrocellulose may not be precipitated during the final stages of drying. However, it is desirable that the diluent does not evaporate so rapidly as to prevent good flow. A suitable petroleum distillate, for example, is one which evaporates from the mixture in approximately five-sixths the time required by the solvent, and the distillate should preferably evaporate in not less than two-thirds the time required by the solvent. Furthermore, in order that there be minimum attack upon the undercoat, it is advisable that the solvent-diluent ratio should not vary materially from a value slightly under the tolerance value of the solvent during the brushing and drying periods of the lacquer.

It is thus seen that the ideal diluent is one which evaporates in slightly less time than the solvent and which has an evaporation rate approximately parallel to that of the solvent. Due to the fact that petroleum distillates commercially available are mixures of hydrocarbons, and therefore do not evaporate at a constant rate, it is often advantageous to choose a mixture of lactic acid esters or of esters and alcohols (as latent solvents) which gives an evaporation curve approximately parallel to that of the available distillate. However, as pointed out above, it is preferable, from the standpoint of obtaining maximum brushing time with minimum drying time, to use a single ester as the solvent; and this will necessitate the choice of a distillate, the greatest portion of which has a narrow boiling range slightly below that of the ester used.

However, as is known to those skilled in the art, the tolerance of any particular solvent is found to decrease with increasing concentration of the nitrocellulose, so that the above specification for the diluent will have to be revised somewhat to take this factor into consideration if the absolute minimum attack on the undercoat or first coat of lacquer is to be obtained. The ideal diluent, then, is one which will evaporate at such a rate that at all times during the application and drying of the lacquer the amount of diluent present is slightly under the tolerance value of the solvent. It is apparent, of course, that although this is the ideal diluent, for the purposes of the present invention, a diluent closely approaching the qualities of the ideal diluent would be eminently satisfactory.

Such a diluent may readily be chosen by means of a simple trial experiment. A lacquer is made up which contains a petroleum diluent having a boiling range indicating that it will evaporate in from three-fourths to five-sixths the time required for the solvent. The proportion of diluent is adjusted so that it is just below the tolerance value of the solvent, i. e., the laquer has initially a small excess tolerance, say 10%. This lacquer is then placed in a vessel through which air is bubbled, and samples are taken at intervals during the evaporation until the lacquer is too viscous for further analyses. The excess tolerance is then determined for each of the samples, i. e., the sample is titrated with diluent until the nitrocellulose is precipitated, and the amount of diluent required will represent the excess tolerance of the lacquer at that point in the evaporation. From these values, a diluent can be specified which will give a substantially constant excess tolerance value throughout the evaporation period. For example, if the excess tolerance is found to rise toward the end of the evaporation period, a diluent should be chosen which contains a greater proportion of high-boiling constituents; or if the excess tolerance is found to drop during an intermediate period of the evaporation, a diluent should be chosen which contains a greater proportion of low boiling constituents and a smaller proportion of intermediate boiling constituents. In this way it may be seen that a petroleum fraction, or a blend of petroleum fractions, may readily be chosen which will produce a lacquer of approximately constant excess tolerance.

In addition to the decrease in tolerance due to the normal increase in concentration of nitrocellulose during the drying of the film, there is sometimes found to be an apparent decrease in tolerance during the brushing period if the lacquer is applied over a previous coating of lacquer and especially if the undercoat is clear lacquer. The reasons for this phenomenon are not sufficiently understood, but it is probable that it is due to selective absorption of the solvents by the undercoat. In such cases an adjustment should be made to insure sufficient excess tolerance during the brushing period. This may be accomplished by increasing the amount of solvent in the mixture or by choosing a diluent which has sufficient low boiling constituents so as to evaporate sufficiently rapidly during the brushing period. This phenomenon is also encountered, to a certain extent, in applying the second coat of a two coat application. In this case the difficulty may be obviated by adding to the second coat a small amount of thinner rich in solvents.

Although the petroleum hydrocarbon diluent should comprise by far the greater portion of the total diluent, smaller amounts of other materials may be employed. Small amounts of aromatic hydrocarbons such as xylol or toluol, or small amounts of terpine derivatives such as turpentine, dipentine, or pine oil may often be used to advantage. For example, an addition of 5% of turpentine will be found not to affect materially the solvent-diluent balance, and will improve the odor of the lacquer to a marked extent.

The present invention can best be illustrated by the following specific examples of brushing lacquers having the improved properties discussed above:

Example I

| | Parts by weight |
|---|---|
| Nitrocellulose | 12 |
| Ester gum | 9 |
| Dibutyl phthalate | 6 |
| Titanium dioxide | 10 |
| Prussian blue | 2 |

Incorporated in 100 parts of a solvent mixture comprising:

| | Parts by volume |
|---|---|
| Isopropyl lactate | 45 |
| Petroleum distillate (boiling range 120–170° C.) | 55 |

Example II

| | Parts by weight |
|---|---|
| Nitrocellulose | 12 |
| Ester gum | 5 |
| Dammar | 5 |
| Tricresyl phosphate | 8 |
| Titanium dioxide | 20 |
| Zinc oxide | 10 |

Incorporated in 100 parts of a solvent mixture comprising:

| | Parts by volume |
|---|---|
| Normal propyl lactate | 50 |
| Petroleum distillate (boiling range 130–180° C.) | 45 |
| Dipentene | 5 |

Example III

| | Parts by weight |
|---|---|
| Nitrocellulose | 12 |
| Dammar | 10 |
| Dibutyl phthalate | 8 |
| Titanium dioxide | 30 |

Incorporated in 100 parts of a solvent mixture comprising:

| | Parts by volume |
|---|---|
| Isobutyl lactate | 38 |
| Petroleum distillate (boiling range 140–190° C.) | 62 |

Example IV

| | Parts by weight |
|---|---|
| Nitrocellulose | 12 |
| Ester gum | 9 |
| Dibutyl phthalate | 6 |
| Titanium dioxide | 30 |

Incorporated in 100 parts of a solvent mixture comprising:

| | Parts by volume |
|---|---|
| Secondary butyl lactate | 42 |
| Petroleum distillate (boiling range 135–185° C.) | 53 |
| Turpentine | 5 |

Example V

| | Parts by weight |
|---|---|
| Nitrocellulose | 14 |
| Glyptal resin ("Rezyl 12") | 20 |
| Dibutyl phthalate | 3 |
| Titanium dioxide | 35 |

Incorporated in 100 parts of a solvent mixture comprising:

| | Parts by volume |
|---|---|
| Normal butyl lactate | 41 |
| Petroleum distillate (boiling range 150–200° C.) | 59 |

Example VI

| | Parts by weight |
|---|---|
| Nitrocellulose | 12 |
| Ester gum | 5 |
| Dammar | 5 |
| Tricresyl phosphate | 8 |
| Titanium dioxide | 10 |
| Prussian blue | 2 |

Incorporated in 100 parts of a solvent mixture comprising:

| | Parts by volume |
|---|---|
| Normal butyl lactate | 31 |
| Normal butyl alcohol | 10 |
| Petroleum distillate (boiling range 140–190° C.) | 59 |

Example VII

| | Parts by weight |
|---|---|
| Nitrocellulose | 12 |
| Glyptal resin ("Rezyl 12") | 20 |
| Dibutyl phthalate | 3 |
| Titanium dioxide | 30 |

Incorporated in 100 parts of a solvent mixture comprising:

| | Parts by volume |
|---|---|
| Normal amyl lactate | 33 |
| Petroleum distillate (boiling range 165–205° C.) | 62 |
| Pine oil | 5 |

Example VIII

| | Parts by weight |
|---|---|
| Nitrocellulose | 12 |
| Dammar | 10 |
| Tricresyl phosphate | 8 |
| Titanium dioxide | 30 |

Incorporated in 100 parts of a solvent mixture comprising:

| | Parts by volume |
|---|---|
| Normal amyl lactate | 25 |
| Normal amyl alcohol | 10 |
| Petroleum distillate (boiling range 155–195° C.) | 65 |

In the above formulæ the ratio of solvent to diluent has been chosen in accord with the petroleum hydrocarbon tolerance value of the solvent, with an added margin of safety. It should be pointed out that although only the boiling range was specified in the examples, a petroleum distillate was chosen in each case whose evaporation rate was such that at all times during the brushing and drying of the lacquer the diluent was present in an amount only slightly less than the tolerance value of the solvent employed. In other words, the evaporation rate of the petroleum distillate was such that the lacquer had a substantially constant excess tolerance value during its application and drying periods.

It is to be understood, of course, that this invention is not to be limited to the use of the particular gums, plasticizers, pigments, etc. which are included in the above examples. Any of the commonly used materials may be incorporated into lacquers made according to the present invention, and, as previously pointed out, solvents other than lactic esters and diluents other than petroleum distillates may be used in relatively small amounts, although this is generally not to be preferred. The nitrocellulose used in the above examples is the usual "half-second cotton", but other varieties of low viscosity cotton, for example four-second cotton, may be employed. In these cases, however, the formation must be changed to take into consideration any differences in tolerance of the particular nitrocellulose solutions employed.

The invention now having been described, what is claimed is:

1. A lacquer composition comprising nitrocellulose, a lactic acid ester of a monohydric aliphatic alcohol containing from three to five carbon atoms and a diluent comprising essentially a petroleum hydrocarbon mixture whose evaporation rate is greater than that of the lactic acid ester, the proportion of said hydrocarbon mixture being such that the lacquer has a low excess tolerance value.

2. A lacquer composition comprising nitrocellulose, a propyl ester of lactic acid and a diluent comprising essentially a petroleum hydrocarbon mixture whose evaporation rate is greater than that of the lactic acid ester, the proportion of said hydrocarbon mixture being such that the lacquer has a low excess tolerance value.

3. A lacquer composition comprising nitrocellulose, a butyl ester of lactic acid and a diluent comprising essentially a petroleum hydrocarbon mixture whose evaporation rate is greater than that of the lactic acid ester, the proportion of said hydrocarbon mixture being such that the lacquer has a low excess tolerance value.

4. A lacquer composition comprising nitrocellulose, normal butyl lactate and a diluent comprising essentially a petroleum hydrocarbon mixture whose evaporation rate is greater than that of the normal butyl lactate, the proportion of said hydrocarbon mixture being such that the lacquer has a low excess tolerance value.

5. A lacquer composition comprising nitrocellulose, an amyl ester of lactic acid and a diluent comprising essentially a petroleum hydrocarbon mixture whose evaporation rate is greater than that of the lactic acid ester, the proportion of said hydrocarbon mixture being such that the lacquer has a low excess tolerance value.

6. A lacquer composition comprising nitrocellulose, a lactic acid ester of a monohydric aliphatic alcohol containing from three to five carbon atoms and a diluent comprising essentially a petroleum hydrocarbon mixture, the proportion of said petroleum hydrocarbon mixture being such that the lacquer has initially a low excess tolerance value, and the rate of evaporation of said petroleum hydrocarbon mixture being such that the lacquer has a substantially constant excess tolerance value throughout its application and drying periods.

7. A lacquer composition comprising nitrocellulose, a propyl ester of lactic acid and a diluent comprising essentially a petroleum hydrocarbon mixture, the proportion of said petroleum hydrocarbon mixture being such that the lacquer has initially a low excess tolerance value, and the rate of evaporation of said petroleum hydrocarbon mixture being such that the lacquer has a substantially constant excess tolerance value throughout its application and drying periods.

8. A lacquer composition comprising nitrocellulose, a butyl ester of lactic acid and a diluent comprising essentially a petroleum hydrocarbon mixture, the proportion of said petroleum hydrocarbon mixture being such that the lacquer has initially a low excess tolerance value, and the rate of evaporation of said petroleum hydrocarbon mixture being such that the lacquer has a substantially constant excess tolerance value throughout its application and drying periods.

9. A lacquer composition comprising nitrocellulose, normal butyl lactate and a diluent comprising essentially a petroleum hydrocarbon mixture, the proportion of said petroleum hydrocarbon mixture being such that the lacquer has initially a low excess tolerance value, and the rate of evaporation of said petroleum hydrocarbon mixture being such that the lacquer has a substantially constant excess tolerance value throughout its application and drying periods.

10. A lacquer composition comprising nitrocellulose, an amyl ester of lactic acid and a diluent comprising essentially a petroleum hydrocarbon mixture, the proportion of said petroleum hydrocarbon mixture being such that the lacquer has initially a low excess tolerance value, and the rate of evaporation of said petroleum hydrocarbon mixture being such that the lacquer has a substantially constant excess tolerance value throughout its application and drying periods.

CHARLES BOGIN.